(12) United States Patent
Danilov et al.

(10) Patent No.: US 10,956,276 B2
(45) Date of Patent: Mar. 23, 2021

(54) SYSTEM STATE RECOVERY IN A DISTRIBUTED, CLOUD-BASED STORAGE SYSTEM

(71) Applicant: EMC IP Holding Company LLC, Hopkinton, MA (US)

(72) Inventors: Mikhail Danilov, Saint Petersburg (RU); Mikhail Borisov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 165 days.

(21) Appl. No.: 16/382,751

(22) Filed: Apr. 12, 2019

(65) Prior Publication Data

US 2020/0117547 A1   Apr. 16, 2020

(30) Foreign Application Priority Data

Oct. 11, 2018   (RU) ................................ 2018135968

(51) Int. Cl.
| | |
|---|---|
| *G06F 12/00* | (2006.01) |
| *G06F 11/14* | (2006.01) |
| *G06F 3/06* | (2006.01) |
| *G06F 16/901* | (2019.01) |

(52) U.S. Cl.
CPC .......... *G06F 11/1458* (2013.01); *G06F 3/064* (2013.01); *G06F 3/067* (2013.01); *G06F 3/0619* (2013.01); *G06F 11/1435* (2013.01); *G06F 16/9017* (2019.01); *G06F 16/9027* (2019.01)

(58) Field of Classification Search
None
See application file for complete search history.

(56) References Cited

U.S. PATENT DOCUMENTS

| | | | |
|---|---|---|---|
| 9,411,717 B2* | 8/2016 | Goss | G06F 11/1012 |
| 2002/0049883 A1* | 4/2002 | Schneider | G06F 21/80 711/100 |
| 2013/0013564 A1* | 1/2013 | Ben-Or | G06F 11/1662 707/640 |
| 2020/0034471 A1* | 1/2020 | Danilov | G06F 12/0261 |

\* cited by examiner

*Primary Examiner* — Daniel D Tsui
(74) *Attorney, Agent, or Firm* — Anne-Marie Dinius; Ryan, Mason & Lewis, LLP

(57) ABSTRACT

The system state recovery methods, systems and products disclosed herein enable an efficient means of recovering from a permanent site outage event in a distributed, block-based storage system. Embodiments teach using directory trees and journal updates for neighboring zones, which are still operational, as a means of recovering data for the site experiencing an outage. We further disclose load balancing techniques in order to improve efficiency of recovery. Load balancing is performed by selecting a leader zone and a group of non-leaders, which will comprise a set of recovery drivers. The systems within the set of recovery drivers are used to piece together lost data from the zone experiencing an outage. In embodiments, the systems, methods and products could be used with an Elastic Cloud System™.

12 Claims, 6 Drawing Sheets

SYSTEM STATE RECOVERY IN A DISTRIBUTED, CLOUD-BASED STORAGE SYSTEM

TECHNICAL FIELD

The subject disclosure relates generally to data recovery in distributed, cloud-based data storage system.

BACKGROUND

The large increase in the amount of data generated by digital systems has created a new set of challenges for data storage environments. In today's markets, there are myriad types of data storage platforms. Increasingly, data storage has become cloud-based. Dell EMC offers a wide range of data storage options, one of which is called Elastic Cloud Storage (ECS). ECS™ is a cloud-based storage system that supports geographically distributed setups consisting of two or more zones.

ECS uses a specific method for disk capacity management, wherein disk space is partitioned into a set of blocks of fixed size called chunks. Information within the data storage system, including user data and metadata, is stored in these chunks. ECS employs different types of chunks, one type per capacity user. In particular, user data is stored in so called Repository chunks, or Repo chunks for short. All the metadata is stored in Directory Tables (DTs), where each DT is a set of tree-like structures. These tree-like structures, trees for short, are stored in Tree chunks. Each tree has a journal of updates. Tree journals are stored in Journal chunks. Chunks of each type are shared. For instance, one Repo chunk may contain segments of several user objects; one Tree chunk may contain elements of several trees; etc.

ECS implements bulk tree updates in order to minimize the total cost of updates. The system keeps an effective state of a tree (the state, which takes into account the tree's journal) in a volatile memory in a memory table. Once a memory table is dumped to a non-volatile memory as a new version of a tree, corresponding Journal chunks can be deleted.

As indicated above, ECS is a cloud-based storage system that supports geographically distributed setups consisting of two or more zones. The corresponding feature is called GEO. GEO can be used to provide an additional protection of user data and metadata by means of asynchronous replication. ECS does not replicate objects. The replication mechanism works at the chunk level. Namely, ECS replicates Repo chunks with user data and Journal chunks with system and user metadata. Journal chunks are replicated to all zones within one GEO setup. Storage services at each replication destination side keep their copies of key DTs of remote zones. Storage services replay journals the zone receives from other zones and update their views on the remote trees (DTs).

When a zone is lost we say that the zone enters PSO (Permanent Site Outage) state. This event causes zone state recovery. Remaining zones most probably already handled data and metadata that were created and, therefore, replicated quite some time ago. Handling of recently created data/metadata is a tricky business because replication is asynchronous, replication order is not defined, and speed of replication to different destination zones may vary.

At the tree level, the existing implementation of PSO handling works as follows:
a. Each zone replays the journal it received from the failed zone;
b. A zone stops replaying at the moment another journal entry or a Repo chunk referenced from another journal entry is missing;
c. The remaining zones compare resulting (also called final) trees they managed to build;
d. A zone that has a most complete (up-to-date) tree becomes an owner of the tree.

We say that zone recovery is over when there is a complete set of final trees and each tree has a new zone to own it. Zone recovery may also imply recovery and re-protection of Repo chunks. However, this is tangential for purposes of embodiments herein.

The existing implementation of PSO handling has the following problems:
a. Resource-inefficiency. During PSO handling, all zones do the same work;
b. Non-exhaustiveness. Each zone runs recovery independently. Lack of coordination between zones does not allow exhaustive recovery of a zone state;
c. System imbalance. A zone with the best network between itself and a failed zone may end up owning all of the final trees.

There is thus a need for a new, more mature, method for PSO handling.

The above-described background relating to ECS is merely intended to provide a contextual overview of some current issues, and is not intended to be exhaustive. In addition, the problems highlighted and sought to be overcome are equally applicable to distributed storage systems other than those designed, manufactured, or sold by Dell EMC. Other contextual information may become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Example systems and methods disclosed herein relate to facilitating state recovery in a distributed, block-based data storage system. We teach using directory trees and journal updates to recovering data in a multi-zone environment when a zone has experienced a performance outage. Our methods, systems, and products use load balancing techniques to enhance overall system performance.

In a method embodiment, we disclose a method of state recovery in a distributed block-based storage system having at least three zones comprising: receiving an indication that a third zone has experienced an outage, the third zone having a plurality of directory trees; choosing a set of recovery drivers to be used to recover the plurality of directory trees from the third zone, further comprising: determining a tree update chronology for the first zone as a function of time; determining a tree update chronology for the second zone as a function of time; the chronological tree update for the first zone with the chronological tree update for the second zone; selecting a leader zone based on the comparison, the leader zone having a chronological tree update extending further in time; and determining if the non-leader zone can reach the leader zone by comparing a chronological journal update for the non-leader zone to the leader zone's chronological tree update, if the chronological journal update is at least as far in time as the leader zone's chronological tree update, adding the non-leader zone to the set of recovery drivers; adding the leader zone to the set of recovery drivers; and storing the set of recovery drivers in the memory.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
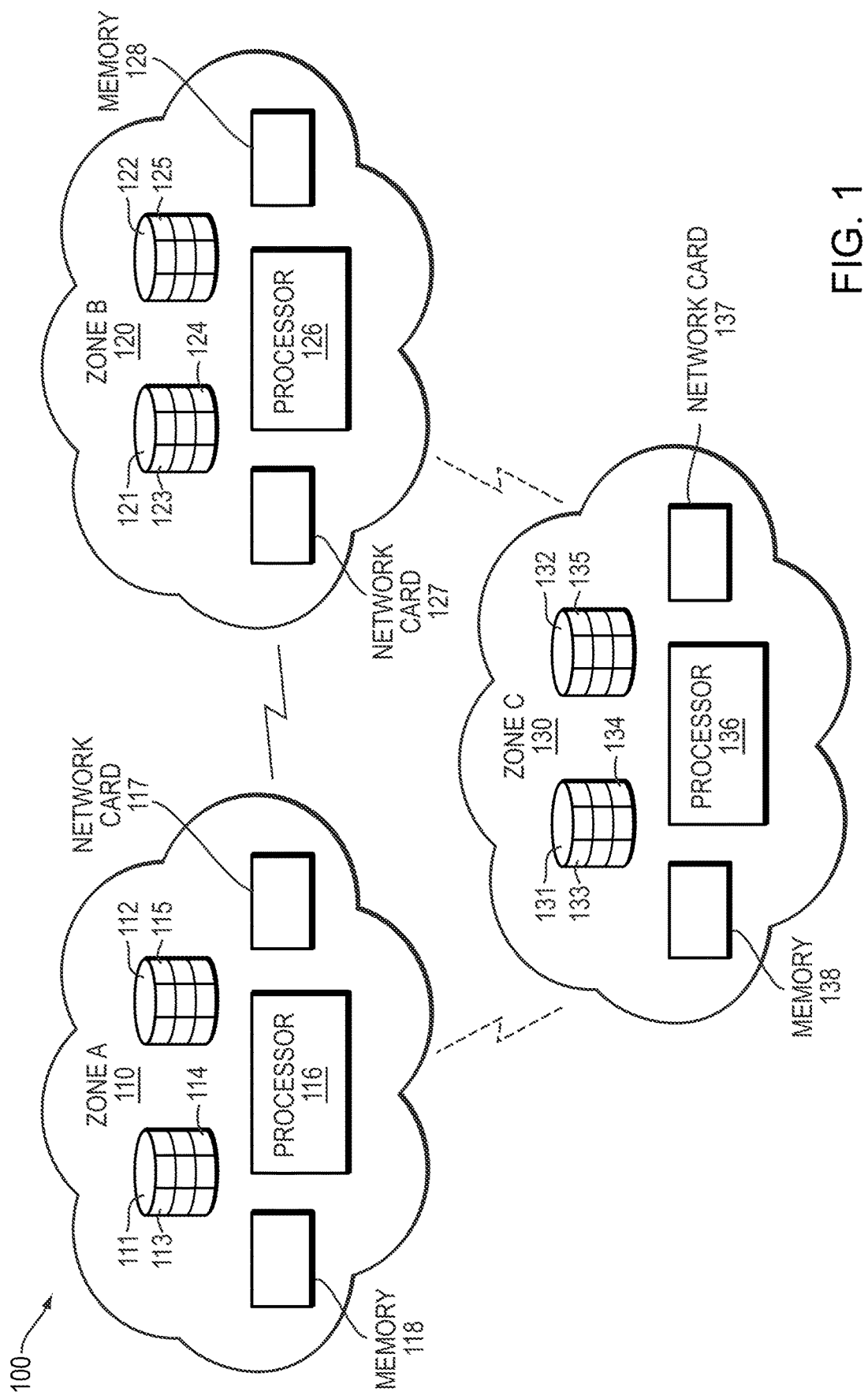
FIG. 1 illustrates an example cloud-based distributed storage system that facilitates state recovery according to embodiments herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The term "cloud" as used herein can refer to a cluster of nodes (e.g., set of network servers), for example, within a distributed object storage system, that are communicatively and/or operatively coupled to each other, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with each other to provide resources for end-users.

Example systems and methods disclosed herein, in one or more embodiments, relate to cloud storage systems, such as, but not limited to an elastic cloud storage (ECS™) platform. The ECS™ platform combines the cost advantages of commodity infrastructure with the reliability, availability and serviceability of traditional arrays. In one aspect, the ECS™ platform can comprise a cluster of nodes (also referred to as "cluster" herein) that delivers scalable and simple public cloud services with the reliability and/or control of a private-cloud infrastructure. Moreover, the ECS™ platform comprises a scale-out, cluster-based, shared-nothing object storage, which employs a microservices architecture pattern.

The ECS™ platform can support storage, manipulation, and/or analysis of unstructured data on a massive scale on commodity hardware. As an example, ECS™ can support mobile, cloud, big data, content-sharing, and/or social networking applications. ECS™ can be deployed as a turnkey storage appliance or as a software product that can be installed on a set of qualified commodity servers and/or disks. The ECS™ scale-out and geo-distributed architecture is a cloud platform that can provide at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In an aspect, ECS™ does not rely on a file system for disk capacity management. Instead, ECS™ partitions disk space into a set of blocks of fixed size called chunks (e.g., having a chunk size of 128 MB). User data is stored in these chunks and the chunks are shared. Although the systems and methods disclosed herein have been described with respect to object storage systems (e.g., ECS™), it is noted that the subject specification is not limited to object storage systems and can be utilized for most any geo-distributed storage systems.

Typically, organizations protect against outages or information loss by backing-up (e.g., replicating) their data periodically. During backup, one or more duplicate or deduplicated copies of the primary data are created and written to a new disk or to a tape. For disaster recovery purposes, a backup copy can be transported or replicated offsite to ensure the data is safe in the event of a disaster (e.g. resulting in a site-wide failure). A single point of failure is a risk of data loss and/or system unavailability. A single device, building, metropolitan area, power grid, natural disaster zone (e.g., flood zone, earthquake zone, hurricane zone, etc.), accident/attack zone (e.g., malicious attack) can represent a single point of failure. Redundancy and the distance that spans those points of failure can enable disaster recovery to keep the organizations operating smoothly regardless of the cause of the unplanned outage.

In one aspect, the systems and methods herein relate to providing disaster recovery by utilizing an efficient method to handle PSO (Permanent Site Outage) events in ECS. Our embodiments assure resource efficiency by making sure that each tree is recovered by one zone (a tree's recovery driver zone). With the proposed embodiments, zones interchange journals to assure exhaustiveness of zone state recovery. A simple load balancing technique, which is a part of our invention, helps to avoid load imbalance during recovery and after recovery is completed at the GEO level.

To better understand the teachings of our inventive concepts, we begin with considering recovery of a single tree. The first step of the proposed method is to find a recovery driver for the tree. That is a zone to drive recovery for the tree. The obvious way to choose a recovery driver is to pick up a zone, which already contains the greatest amount of data related to the tree. However, this may result in having just one zone to drive recovery of all the trees from the failed zone.

Instead, in embodiments we detect a set of zones that may potentially become a recovery driver for each tree. Later on, these sets produced for all the trees may be used to distribute workload associated with being a recovery driver and an owner more or less evenly between zones.

With reference to FIG. 1, we show a cloud-based, block-based, distributed storage system 100 having three zones, Zone A 110, Zone B, 120, and Zone C 130. Within each Zone 110, 120, 130, there are data storage devices 111, 112, 121, 122, 131, 132, respectively. Data storage devices 111, 112, 121, 122, 131, 132 could be disk drives in some embodiments. Each storage device 111, 112, 121, 122, 131, 132 is partitioned into a plurality of chunks 113, 114, 115, 123, 124, 125, 133, 134, 135. These chunks 113, 114, 115, 123, 124, 125, 133, 134, 135 are configured for storing user data in a repo chunk, metadata in a tree chunk and journal data in a journal chunk. Journal data corresponds to updates made on trees.

Each Zone 110, 120, 130 also contains a processor 116, 126, 136, volatile and non-volatile memory 118, 128, 138, and a network card 117, 127, 137 for communicating with other Zones. Although FIG. 1 shows these components as stand-alone devices, those of skill in the art will recognize that each component individually, or all these components could be integrated into storage devices 111, 112, 121, 122, 131, 132. Similarly, processors 116, 126, 136, memory 118, 128, 138, and network cards 117, 127, 137 could be integrated together as a single device or in any combination without changing the functioning and teachings of the embodiments herein.

For purposes of illustration, we assume that Zone C 130 has experienced an outage sufficient to be classified as a Permanent Site Outage (PSO). Of note, in the art, use of the term "permanent" in describing loss of connectivity of a Zone 130 to its neighboring Zones 110, 120 within the block-based, distributed storage system 100 is not intended to mean that Zone C 130 has been permanently disabled. Rather, a PSO can occur when connectivity between a zone and its neighbors has been disrupted for a predetermined amount of time. In alternate embodiments, the amount of time could be set by a system administrator.

Figure 2:
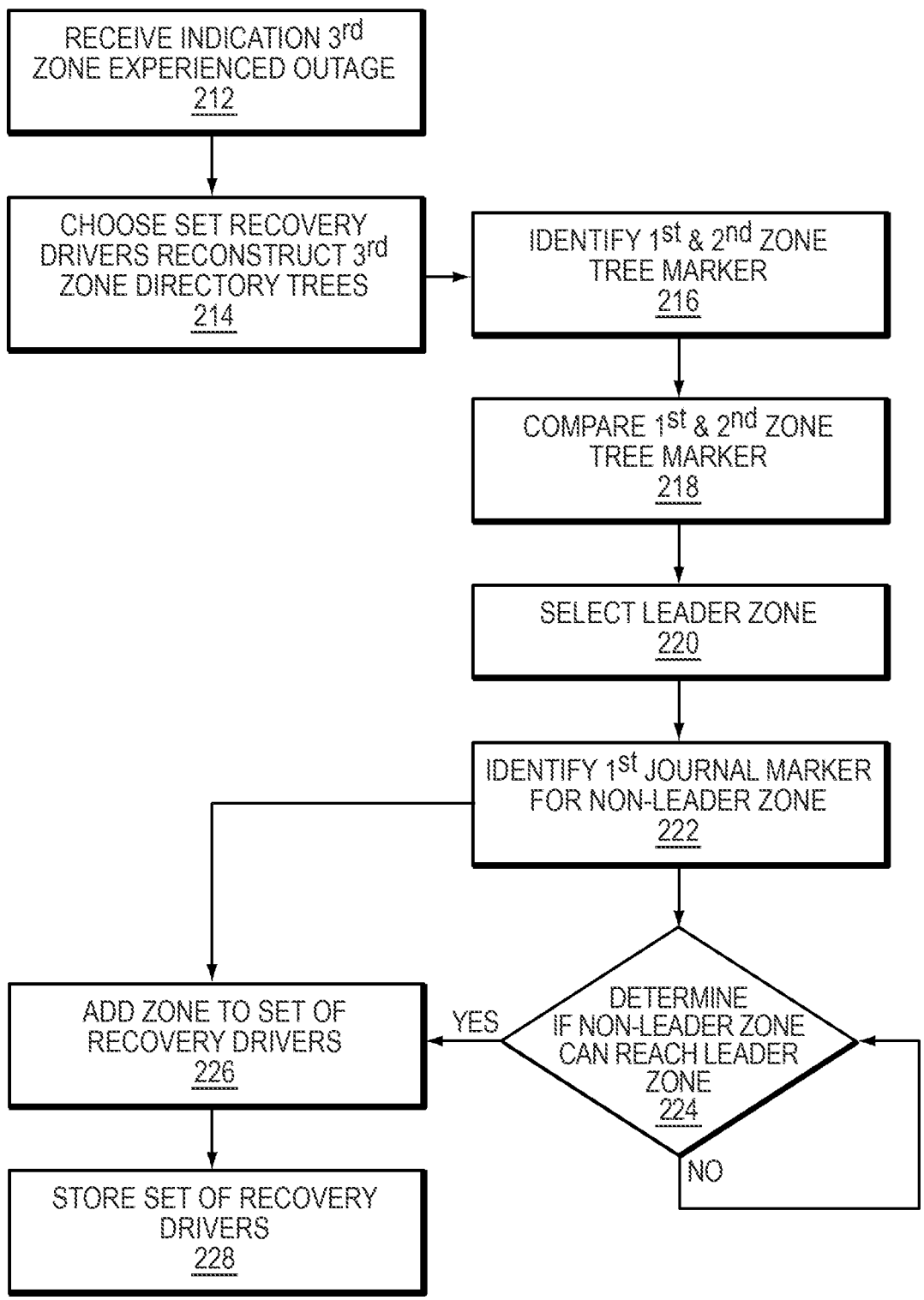
FIG. 2 shows a flow chart describing steps according to method embodiments disclosed herein.

In order to recover lost data from Zone C 130, we determine which zones could potentially become recovery drivers for each tree within Zone C. Once these recovery drivers have been established, in some embodiments we use load balancing techniques to distribute the workload associated with being a recovery driver and a leader zone across multiple zones. FIG. 2 depicts the steps associated with embodiments herein for choosing a set of recover drivers and a leader zone from the set of recovery drivers. The steps of these embodiments are further illustrated with reference to FIGS. 3A and 3B.

We describe the data recovery teachings herein to be initiated within a block-based data storage system 100 by using an exemplary system having three zones 110, 120, 130. Those of skill in the art will recognize the applicability of our teachings to block-based, distributed storage systems 100 having myriad zones. As an initial matter, in order for the data recovery techniques to be initiated, the block-based data storage system 100 would receive 212 an indication that a zone within the system had experienced an outage. As described previously, each zone 110, 120, 130 has a plurality of directory trees and journal chunks stored therein.

When a block-based, distributed data storage system 100 experiences an outage, it is desirable to reconstruct data storage actions that have occurred within the failed zone to the best capability of the block-based, distributed data storage system 100. Toward that end, we use directory tree and journal information stored in neighboring zones to reconstruct the data contained in the zone experiencing an outage. An additional goal in reconstructing data is to balance the load across the functioning zones so that the overall system experiences an efficient distribution of work associated with reconstructing any potential data loss caused by the zone outage.

Figure 3A:
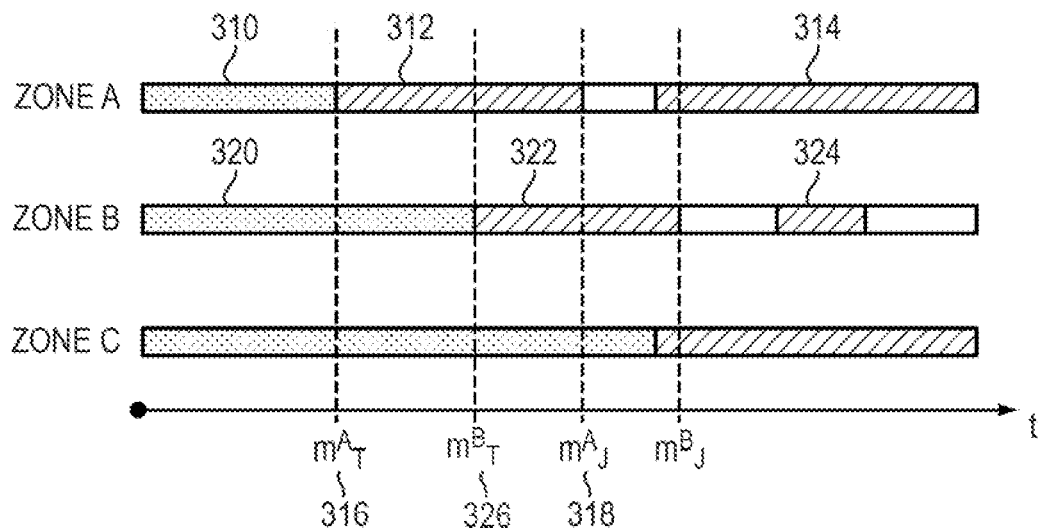
FIG. 3A illustrates an example of tree directory and journal updates for a cloud-based distributed storage system according to embodiments herein.
Figure 3B:
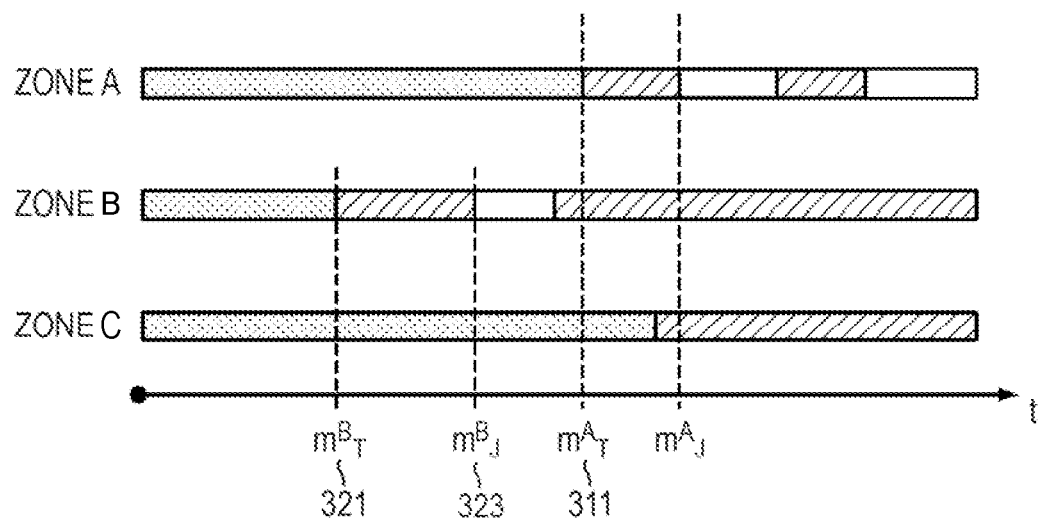
FIG. 3B illustrates an example of tree directory and journal updates for a cloud-based distributed storage system according to embodiments herein.

In our example, we assume Zone C 130 has experienced an outage. Obviously, the teachings herein are equally applicable if Zone A 110 or Zone B 120 experienced an outage. In order to begin the data recovery process, we choose 214 a set of recovery drivers from Zone A 110 and Zone B 120 that will be used to recover the directory tress in the failed zone, Zone C 130. FIG. 2, FIG. 3A, and FIG. 3B are helpful for illustrating this process.

FIGS. 3A and 3B show two exemplary directory trees. In both figures, solid fill is used to delineate directory trees persisted as a function of time; and cross-sectional hash marks are used to delineate journal updates persisted as a function of time. In FIG. 3A, Zone A has one directory tree update 310 and two journal updates 312, 314. Zone B also has one tree update 320 and two journal updates 322, 324. The effective state of a tree is a result of a stream of updates applied to it. Updates are sorted chronologically. Updates can be persisted in a tree or in a journal. In our example, when Zone C fails, the effective state of its tree could be reconstructed using the latest version of a tree persisted in the non-volatile memory of a functioning zone(s), as well as a set of updates persisted in journal chunks from a functioning zone(s).

In embodiments, a system, method or product would enter into a data recovery mode once it receives 212 an indication that a zone has experienced an outage. Once a zone has failed, in this example Zone C 130, it becomes necessary to choose 214 a set of recovery drivers to reconstruct Zone C's directory tree. As a starting point, we identify 216 a Zone A tree marker, $m^A{}_T$ 316 and a Zone B tree marker, $m^B{}_T$ 326. We then compare 218 Zone A tree marker 316 to Zone B tree marker 326 in order to determine which is persisted furthest in time. The zone having the tree marker persisted furthest in time is selected 220 as the zone leader. The leader zone is added 226 to a set of recovery drivers, and the set of recovery drivers is stored 228.

Once the zone leader is chosen, we determine 224 if the remaining zones can reach the leader zone. In the hypothetical examples shown here, we use the simplistic scenario of two functioning zones, which means that we need only determine if Zone A in the example depicted in FIG. 3A can reach the leader zone, Zone B in FIG. 3A. In alternate embodiments, this process could be iterative to reflect multiple zones or multiple trees within zones.

The leader zone is said to be "reachable" if, from the perspective of a non-leader zone, there is a journal marker within the non-leader zone that can be used to exceed the point in time persisted by the leader zone's tree marker. Returning to FIG. 2, we determine if a leader zone is reachable by identifying 222 a journal marker for the non-leader zone being evaluated. In this instance, we would identify 222 journal 312 having a journal marker $m^A{}_J$ 318. In this determination, it is important that there be no gaps between tree data 310 and journal data 312 for the non-leader zone.

Turning back to the question of reachability, determining 224 if a leader zone is reachable entails comparing the leader zone's tree marker 326 to the non-leader zone's journal marker 318. If the non-leader zone's journal marker 318 persists at least as far in time as the leader zone's tree marker 326, the leader zone is said to be reachable. In this instance, we add 226 the non-leader zone, Zone A in FIG. 3A, to the set of recovery drivers.

In some situations, a particular zone may not be able to reach the leader zone. FIG. 3B is illustrative. Assume Zone C has experienced an outage and the tree and journal data as a function of time for Zones A and B are as illustrated in FIG. 3B. In this instance, Zone A will be chosen as the leader because its tree marker $m^A_T$ 311 is persisted further in time than Zone B's tree marker $m^B_T$ 321. Once Zone A is chosen as the zone leader, we determine 224 if the non-leader zone, Zone B in this scenario, can reach Zone A. This is done by identifying 222 Zone B's journal marker $m^B_J$ 323, also called a J-marker, and determining if it is persisted further in time than Zone A's tree marker 311, also called a T-marker. As can be seen, Zone B's J-marker 323 lags behind Zone A's T-marker 311, thereby making Zone A an unreachable leader.

In some embodiments, non-leader zones who cannot reach the leader zone can nonetheless be used to reconstruct a zone experiencing an outage if they have journal data that can be used to fill in gaps in the leader zone's journal data.

Figure 4:
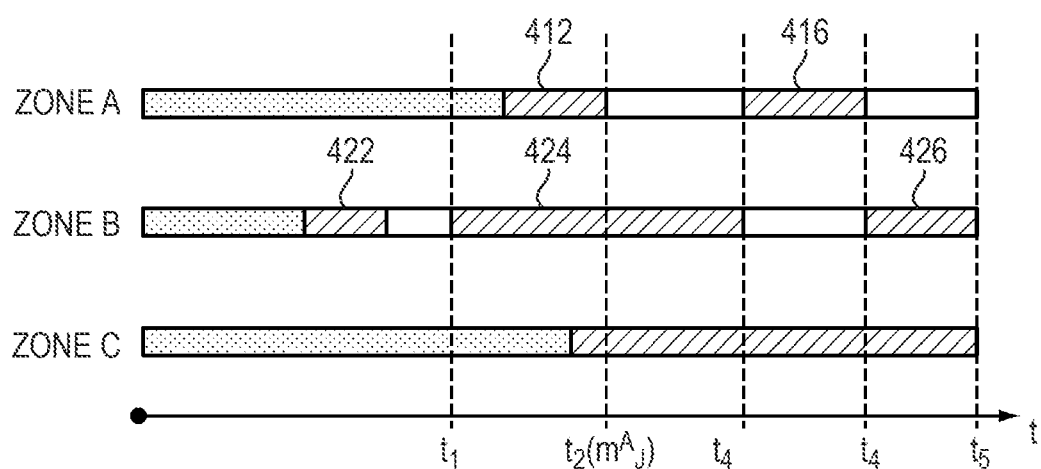
FIG. 4 illustrates an example of tree directory and journal updates for a cloud-based distributed storage system according to embodiments herein.

Once the set of recovery drivers has been reconstructed, in embodiments it can be used to reconstruct the directory tree for the zone experiencing an outage. FIG. 4 is illustrative. FIG. 4 shows Zone A as an unreachable leader from Zone B's perspective. Zone A's T-marker extends to $t_1$, which is persisted further in time than Zone B's first J-marker 422. Zone B nonetheless has helpful data that can be used to reconstruct Zone C's tree directory and journal chunks. Specifically, a portion of Zone B's second journal update 424 could be used to fill in missing data in the leader zone, Zone A's journal updates, namely 412 and 416.

In this scenario, Zone C's information could be reconstructed by having Zone A replay its tree updates and journal updates until it reaches $t_2$. Embodiments could then use the portion of Zone B's journal updates 424 between $t_2$ and $t_3$ to fill the gap in Zone A's journal updates. Switching back to Zone A, its journal 416 from $t_3$ to $t_4$ could then be used for reconstruction purposes. And finally, Zone B's journal 426 from $t_4$ to $t_5$ could be used to complete reconstruction of Zone C's tree and journal information.

In some embodiments, we employ load balancing techniques designed to minimize the number of times any given zone within the set of recovery drives will be used to reconstruct data at the zone experiencing an outage. Table 1 below is illustrative.

| Zone & Tree Outage | Set of Recovery Driver Zones |
|---|---|
| C-T1 | A4 |
| C-T2 | A3, A1 |
| C-T3 | A4, B2, B1 |
| C-T4 | A4, A3, B3 |

In this embodiment, Zone C has experienced an outage. Zone C has 4 trees to be recovered. Determining the set of recovery drivers, including the leader zone will proceed as described previously in the situation where Zone C only had a single tree to recover. Table 1 shows these results. In terms of load balancing, embodiments could seek to minimize the number of times any given zone is used to reconstruct lost data. As can be seen in Table 1, Zone A4 could be used to reconstruct Zones C-T1, C-T3 and C-T4. This could place an unnecessary on Zone A. Accordingly, it would be advantageous to balance the load among the potential zones within the set of recovery drivers.

Figure 5:
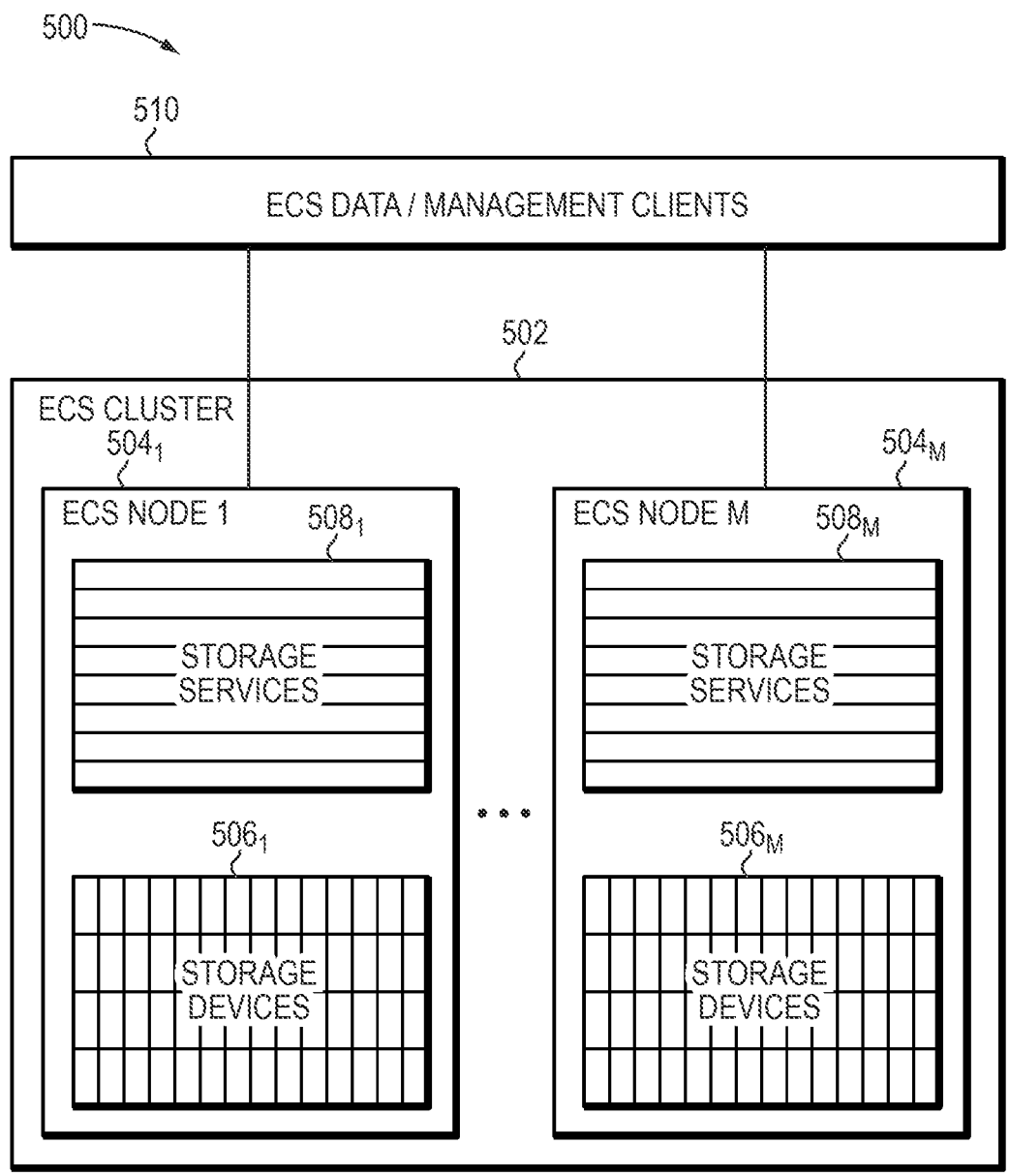
FIG. 5 illustrates high-level architecture of an Elastic Cloud Storage (ECS™) cluster that facilitates enhanced data protection and/or recovery via consolidated erasure coding.

In some embodiments, the teachings herein could be implemented on an Elastic Cloud System (ECS). FIG. 5 illustrates an example high-level architecture 500 of an ECS™ cluster, according to an aspect of the subject disclosure. ECS™ can comprise a software-defined, cloud-scale, object storage platform that combines the cost advantages of commodity infrastructure with the reliability, availability and serviceability of traditional arrays. With ECS™, an organization can deliver scalable and simple public cloud services with the reliability and control of a private-cloud infrastructure. ECS™ provides comprehensive protocol support for unstructured (object and/or file) workloads on a single, cloud-scale storage platform. In an aspect, the ECS™ cluster 502 can comprise multiple nodes $504_1$-$504_M$, wherein M is most any integer.

It is noted that the ECS™ cluster 502 can be substantially similar to zones described herein, for example, Zones A 110, B 120, C 130. The nodes $504_1$-$504_M$ can comprise storage devices (e.g., hard drives) $506_1$-$506_M$ and can run a set of services $508_1$-$508_M$. For example, a single node that runs ECS™ version 3.0 can manage 20 independent services. Further, ECS™ data/management clients 510 can be coupled to the nodes $504_1$-$504_M$.

The ECS™ cluster 502 does not protect user data with traditional schemes like mirroring or parity protection. Instead, the ECS™ cluster 502 utilizes a k+m erasure coding protection scheme, wherein a data block (e.g., data chunk) is divided into k data fragments and m coding fragments are created (e.g., by encoding the k data fragments). Encoding is performed in a manner such that the ECS™ cluster 502 can tolerate the loss of any m fragments. As an example, the default scheme for ECS™ is 12+4, i.e. k equals to 12 and m equals to 4; however, the subject disclosure is not limited to this erasure coding protection scheme. When some fragments are lost, the missing fragments are restored via a decoding operation.

In one aspect, the storage services $508_1$-$508_M$ can handle data availability and protection against data corruption, hardware failures, and/or data center disasters. As an example, the storage services $508_1$-$508_M$ can comprise an unstructured storage engine (USE) (not shown), which is a distributed shared service that runs on each node $504_1$-$504_M$, and manages transactions and persists data to nodes. The USE enables global namespace management across geographically dispersed data centers through geo-replication. In an aspect, the USE can write all object-related data (such as, user data, metadata, object location data) to logical containers of contiguous disk space known as chunks. Chunks are open and accepting writes, or closed and not accepting writes. After chunks are closed, the USE can erasure-code them. The USE can write to chunks in an append-only pattern so that existing data is never overwritten or modified. This strategy improves performance because locking and cache validation is not required for I/O operations. All nodes $504_1$-$504_M$ can process write requests for the same object simultaneously while writing to different chunks.

ECS™ continuously monitors the health of the nodes $504_1$-$504_M$, their disks, and objects stored in the cluster. ECS™ disperses data protection responsibilities across the cluster, it can automatically re-protect at-risk objects when nodes or disks fail. When there is a failure of a node or drive in the site, the USE can identify the chunks and/or erasure coded fragments affected by the failure and can write copies of the affected chunks and/or erasure coded fragments to good nodes and disks that do not currently have copies.

Private and hybrid clouds greatly interest customers, who are facing ever-increasing amounts of data and storage costs, particularly in the public cloud space. ECS™ provides a scale-out and geo-distributed architecture that delivers an on-premise cloud platform that scales to exabytes of data with a TCO (Total Cost of Ownership) that's significantly less than public cloud storage. Further, ECS™ provides versatility, hyper-scalability, powerful features, and use of low-cost industry standard hardware.

Figure 6:
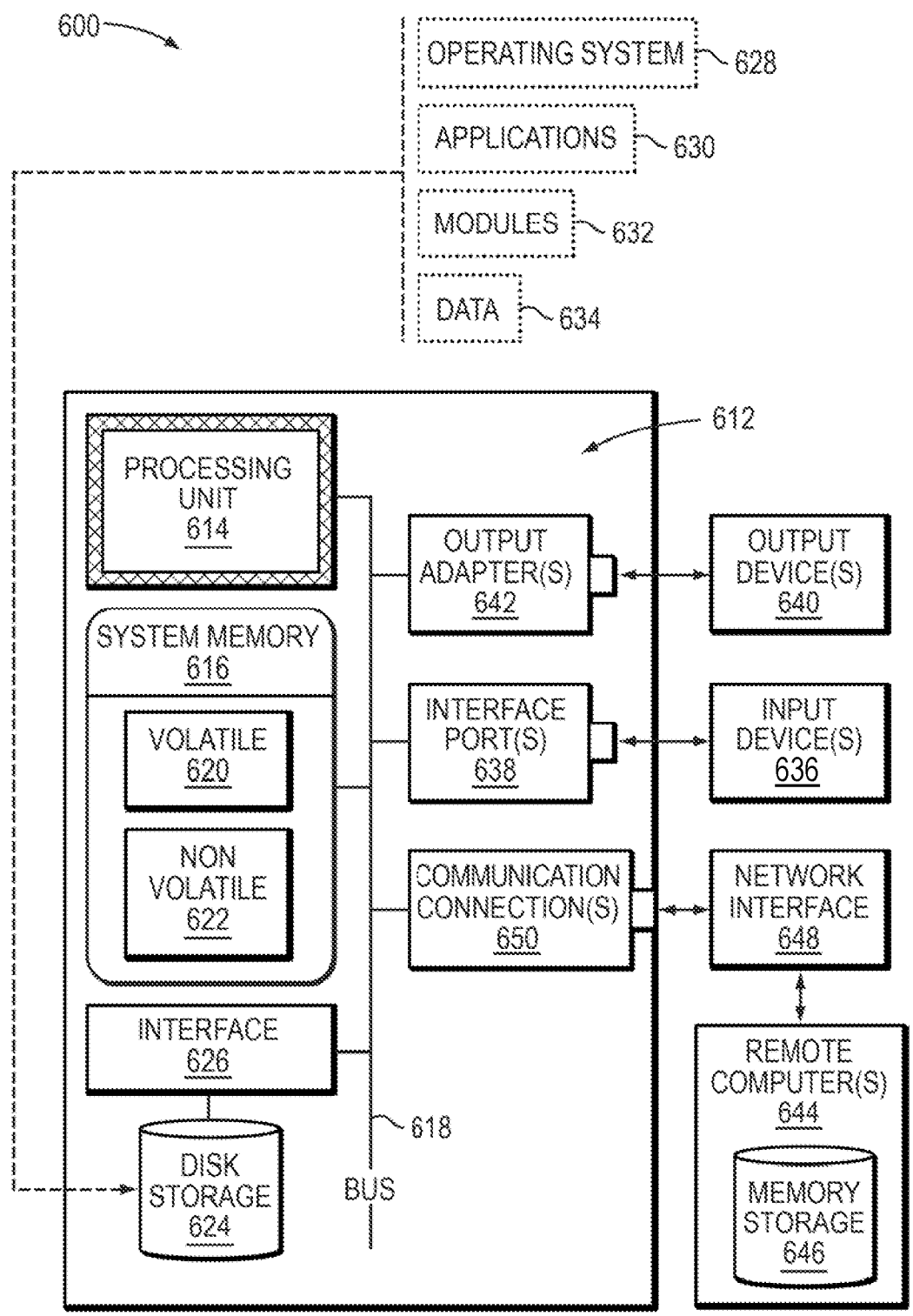
FIG. 6 illustrates a block diagram of an example computer operable to execute the disclosed storage system architecture.

Referring now to FIG. 6, there is illustrated a block diagram of an example computer operable to execute the distributed erasure coding. In order to provide additional context for various aspects of the disclosed subject matter, FIG. 6 and the following discussion are intended to provide a brief, general description of a suitable computing environment 600 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, (e.g., a carrier wave or other transport mechanism), and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

In order to provide a context for the various aspects of the disclosed subject matter, FIG. 6, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 6, a block diagram of a computing system 600 operable to execute the disclosed systems and methods is illustrated, in accordance with an embodiment. Computer 612 comprises a processing unit 614, a system memory 616, and a system bus 618. As an example, the component(s), server(s), node(s), cluster(s), system(s), zone(s), module(s), agent(s), engine(s), and/or device(s) disclosed herein with respect to system 100 and 500 can each include at least a portion of the computing system 600. System bus 618 couples system components comprising, but not limited to, system memory 616 to processing unit 614. Processing unit 614 can be any of various available processors. Dual microprocessors and other multiprocessor architectures also can be employed as processing unit 614.

System bus 618 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 694), small computer systems interface (SCSI), and/or controller area network (CAN) bus used in vehicles.

System memory 616 comprises volatile memory 620 and nonvolatile memory 622. A basic input/output system (BIOS), containing routines to transfer information between elements within computer 612, such as during start-up, can be stored in nonvolatile memory 622. By way of illustration, and not limitation, nonvolatile memory 622 can comprise ROM, PROM, EPROM, EEPROM, or flash memory. Volatile memory 620 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 612 also comprises removable/non-removable, volatile/non-volatile computer storage media. FIG. 6 illustrates, for example, disk storage 624. Disk storage 624 comprises, but is not limited to, devices like a magnetic disk drive, floppy disk drive, tape drive, Jaz drive, Zip drive, LS-100 drive, flash memory card, or memory stick. In addition, disk storage 624 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 624 to system bus 618, a removable or non-removable interface is typically used, such as interface 626.

It is to be appreciated that FIG. 6 describes software that acts as an intermediary between users and computer resources described in suitable operating environment 600. Such software comprises an operating system 628. Operating system 628, which can be stored on disk storage 624, acts to control and allocate resources of computer 612. System applications 630 take advantage of the management of resources by operating system 628 through program modules 632 and program data 634 stored either in system memory 616 or on disk storage 624. It is to be appreciated that the disclosed subject matter can be implemented with various operating systems or combinations of operating systems.

A user can enter commands or information into computer 612 through input device(s) 636. Input devices 636 comprise, but are not limited to, a pointing device such as a mouse, trackball, stylus, touch pad, touch screen, keyboard, microphone, joystick, game pad, satellite dish, scanner, TV tuner card, digital camera, digital video camera, web camera, cellular phone, user equipment, smartphone, and the like. These and other input devices connect to processing unit 614 through system bus 618 via interface port(s) 638. Interface port(s) 638 comprise, for example, a serial port, a parallel port, a game port, a universal serial bus (USB), a wireless based port, e.g., Wi-Fi, Bluetooth®, etc. Output device(s) 640 use some of the same type of ports as input device(s) 636.

Thus, for example, a USB port can be used to provide input to computer 612 and to output information from computer 612 to an output device 640. Output adapter 642 is provided to illustrate that there are some output devices 640, like display devices, light projection devices, monitors, speakers, and printers, among other output devices 640, which use special adapters. Output adapters 642 comprise, by way of illustration and not limitation, video and sound devices, cards, etc. that provide means of connection between output device 640 and system bus 618. It should be noted that other devices and/or systems of devices provide both input and output capabilities such as remote computer(s) 644.

Computer 612 can operate in a networked environment using logical connections to one or more remote computers, such as remote computer(s) 644. Remote computer(s) 644 can be a personal computer, a server, a router, a network PC, a workstation, a microprocessor based appliance, a peer device, or other common network node and the like, and typically comprises many or all of the elements described relative to computer 612.

For purposes of brevity, only a memory storage device 646 is illustrated with remote computer(s) 644. Remote computer(s) 644 is logically connected to computer 612 through a network interface 648 and then physically and/or wirelessly connected via communication connection 650. Network interface 648 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 650 refer(s) to hardware/software employed to connect network interface 648 to bus 618. While communication connection 650 is shown for illustrative clarity inside computer 612, it can also be external to computer 612. The hardware/software for connection to network interface 648 can comprise, for example, internal and external technologies such as modems, comprising regular telephone grade modems, cable modems and DSL modems, wireless modems, ISDN adapters, and Ethernet cards.

The computer 612 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 612 can connect to other devices/networks by way of antenna, port, network interface adaptor, wireless access point, modem, and/or the like.

The computer 612 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth® wireless technologies. Thus, the communication can be a predefined structure as with a conventional network or simply an ad hoc communication between at least two devices.

The computing system 600 is operable to communicate with any wireless devices or entities operatively disposed in wireless communication, e.g., desktop and/or portable computer, server, communications satellite, etc. This includes at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to dynamically perform operations as described herein.

A classifier can be a function that maps an input attribute vector, $x=(x1, x2, x3, x4, xn)$, to a confidence that the input belongs to a class, that is, $f(x)=$confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A distributed block-based storage system having at least three zones, comprising:
   a processor; and
   a memory that stores executable instructions that, when executed by the processor, facilitate performance of operations, comprising:
   a. receiving an indication that a third zone has experienced an outage, the third zone having a plurality of directory trees;
   b. choosing a set of recovery drivers to be used to recover the plurality of directory trees from the third zone, further comprising:
      i. determining a tree update chronology for the first zone as a function of time;
      ii. determining a tree update chronology for the second zone as a function of time;
      iii. comparing the chronological tree update for the first zone with the chronological tree update for the second zone;
      iv. selecting a leader zone based on the comparison, the leader zone having a chronological tree update extending further in time; and
      v. determining if the non-leader zone can reach the leader zone by comparing a chronological journal update for the non-leader zone to the leader zone's chronological tree update, if the chronological journal update is at least as far in time as the leader zone's chronological tree update, adding the non-leader zone to the set of recovery drivers;
   c. adding the leader zone to the set of recovery drivers; and
   d. storing the set of recovery drivers in the memory.

2. The system of claim 1 wherein the processor is further configured to facilitate performance of operations further comprising recovering the third zone's plurality of directory trees using the set of recovery drivers.

3. The system of claim 1 wherein the processor is further configured to facilitate performance of operations further comprising distributing the workload across the set of recovery drivers by minimizing the number of times a zone in the set of recovery drivers is used to recover a directory tree in the third zone.

4. The system of claim 2 wherein the processor is further configured to facilitate performance of operations further comprising:
   a. replaying the leader zone's tree journal;
   b. collecting chronological data corresponding to journal updates for each of the zones in the set of recovery drivers;
   c. chronologically ordering the chronological data for the journal updates for the zones in the set of recovery drivers; and d. replaying a continuous stream of updates for zone three using the chronologically ordered journal updates for the zones in the set of recovery drivers.

5. A method of state recovery in a distributed block-based storage system having at least three zones comprising:
   a. receiving an indication that a third zone has experienced an outage, the third zone having a plurality of directory trees;
   b. choosing a set of recovery drivers to be used to recover the plurality of directory trees from the third zone, further comprising:
      i. determining a tree update chronology for the first zone as a function of time;
      ii. determining a tree update chronology for the second zone as a function of time;
      iii. the chronological tree update for the first zone with the chronological tree update for the second zone;
      iv. selecting a leader zone based on the comparison, the leader zone having a chronological tree update extending further in time; and
      v. determining if the non-leader zone can reach the leader zone by comparing a chronological journal update for the non-leader zone to the leader zone's chronological tree update, if the chronological journal update is at least as far in time as the leader zone's chronological tree update, adding the non-leader zone to the set of recovery drivers;
   c. adding the leader zone to the set of recovery drivers; and
   d. storing the set of recovery drivers in the memory.

6. The method of claim 5 further comprising recovering the third zone's plurality of directory trees using the set of recovery drivers.

7. The method system of claim 5 further comprising distributing the workload across the set of recovery drivers by minimizing the number of times a zone in the set of recovery drivers is used to recover a directory tree in the third zone.

8. The method of claim 6 further comprising:
   a. replaying the leader zone's tree journal;
   b. collecting chronological data corresponding to journal updates for each of the zones in the set of recovery drivers;
   c. chronologically ordering the chronological data for the journal updates for the zones in the set of recovery drivers; and
   d. replaying a continuous stream of updates for zone three using the chronologically ordered journal updates for the zones in the set of recovery drivers.

9. A computer program product for state recovery in a distributed block-based storage system having at least three zones, the computer program product comprising: a computer readable storage medium having computer executable program code embodied therewith, the program code executable by a computer processor to:
   a. receiving an indication that a third zone has experienced an outage, the third zone having a plurality of directory trees;
   b. choosing a set of recovery drivers to be used to recover the plurality of directory trees from the third zone, further comprising:
      i. determining a tree update chronology for the first zone as a function of time;
      ii. determining a tree update chronology for the second zone as a function of time;
      iii. comparing the chronological tree update for the first zone with the chronological tree update for the second zone;
      iv. selecting a leader zone based on the comparison, the leader zone having a chronological tree update extending further in time; and
      v. determining if the non-leader zone can reach the leader zone by comparing a chronological journal update for the non-leader zone to the leader zone's chronological tree update, if the chronological journal update is at least as far in time as the leader zone's chronological tree update, adding the non-leader zone to the set of recovery drivers;
   c. adding the leader zone to the set of recovery drivers; and
   d. storing the set of recovery drivers in the memory.

10. The computer program product of claim 9 wherein the program code executable by a computer processor is further configured to facilitate performance of operations further comprising recovering the third zone's plurality of directory trees using the set of recovery drivers.

11. The computer program product of claim 9 wherein the program code executable by a computer processor is further configured to facilitate performance of operations further comprising distributing the workload across the set of recovery drivers by minimizing the number of times a zone in the set of recovery drivers is used to recover a directory tree in the third zone.

12. The computer product of claim 10 wherein the program code executable by a computer processor is further configured to facilitate performance of operations further comprising:
   a. replaying the leader zone's tree journal;
   b. collecting chronological data corresponding to journal updates for each of the zones in the set of recovery drivers;
   c. chronologically ordering the chronological data for the journal updates for the zones in the set of recovery drivers; and
   d. replaying a continuous stream of updates for zone three using the chronologically ordered journal updates for the zones in the set of recovery drivers.

* * * * *